United States Patent [19]
Renger

[11] 3,929,107
[45] Dec. 30, 1975

[54] RECIPROCATING PISTON INTERNAL COMBUSTION ENGINE

[75] Inventor: Udo Renger, Wolfsburg, Germany

[73] Assignee: Volkswagenwerk Aktiengesellschaft, Wolfsburg, Germany

[22] Filed: Apr. 30, 1974

[21] Appl. No.: 465,582

[30] Foreign Application Priority Data
May 12, 1973 Germany............................ 2324190

[52] U.S. Cl............ 123/32 B; 123/32 C; 123/191 S; 123/DIG. 9
[51] Int. Cl.²............................................ F02B 3/00
[58] Field of Search............. 123/32 C, 32 K, 32 SP, 123/32 B, 32 ST, 33 VC, 37, DIG. 9, 146, 143 R, 143 B, 191 S

[56] References Cited
UNITED STATES PATENTS

| | | | |
|---|---|---|---|
| 1,592,311 | 7/1926 | Porsche | 123/143 B |
| 2,983,268 | 5/1961 | Heintz | 123/191 S B |
| 3,777,724 | 12/1973 | Kiley | 123/32 B |

FOREIGN PATENTS OR APPLICATIONS

| | | | |
|---|---|---|---|
| 13,746 | 6/1904 | United Kingdom | 123/37 |

Primary Examiner—Charles J. Myhre
Assistant Examiner—Paul Devinsky
Attorney, Agent, or Firm—Brumbaugh, Graves, Donohue & Raymond

[57] ABSTRACT

A reciprocating piston internal combustion engine comprises at least one primary cylinder and at least one primary piston. The primary piston is mounted for reciprocating movement in the primary cylinder. A cylinder head overlies the primary cylinder and, with the primary cylinder and the face of the primary piston, defines a primary combustion chamber. At least one subsidiary cylinder is formed in the cylinder head and receives a subsidiary piston mounted for reciprocating movement in the subsidiary cylinder. Defined within the subsidiary cylinder is a subsidiary combustion chamber that communicates with the primary combustion chamber. The subsidiary cylinder moves upwardly in the subsidiary cylinder during upward movement of the primary piston in the primary cylinder and at least intermittently interrupts communication between the primary and subsidiary combustion chambers. The subsidiary piston compresses air-fuel mixture in the subsidiary combustion chamber to a higher pressure than air-fuel mixture is compressed in the primary combustion chamber by the primary piston.

9 Claims, 2 Drawing Figures

3,929,107

RECIPROCATING PISTON INTERNAL COMBUSTION ENGINE

BACKGROUND OF THE INVENTION

As a result of increasingly stringent governmental regulations regarding the content of exhaust gases emitted from internal combustion engines, various efforts are being made to control the amount of noxious components in engine emissions. While one approach to the problem is to treat gases exhausted from the cylinders of an engine before the gases are released to the atmosphere, another approach is to construct an engine that will initially produce exhaust gases having a relatively lower content of noxious components.

Recently, interest has increased in building internal combustion engines that utilize the charge stratification technique as a possible approach to reducing the contaminants, especially nitrogen oxides, in engine exhaust gases. According to the charge stratification technique, a relatively small volume of combustible air-fuel mixture is initially ignited in an engine combustion chamber and the resulting combustion ignites the main charge of combustible air-fuel mixture. Previously, the stratified charge technique was utilized only in attempts to secure dependable ignition of a charge of combustible mixture, while permitting a wider variation in the relative porportions of the mixture components (i.e., air and fuel) than otherwise possible. The technique was also utilized in the past to permit operation of Otto engines at higher compression ratios without reaching the detonation limit.

Internal combustion engines utilizing the charge stratification technique may be constructed with main or primary engine cylinders and corresponding smaller subsidiary cylinders communicating with the main cylinders. Fuel is delivered to the subsidiary cylinders by supplementary fuel injection devices or other delivery apparatus separate from the fuel delivery apparatus for the main cylinders. An air-fuel mixture, often with a relative excess of fuel, is initially ignited in each subsidiary cylinder and combustion then continues into the air-fuel mixture in the corresponding main cylinder. The air-fuel ratio of the combustible charge in the main cylinder is determined in accordance with the current operating conditions of the engine and is generally a relatively lean mixture or even perhaps pure air. One construction of such an engine is described and illustrated in Bradbury U.S. Pat. No. 3,580,231. Engines utilizing main and subsidiary combustion chambers can also ensure smoother running of an internal combustion engine by slowing the pressure rise during combustion.

SUMMARY OF THE INVENTION

The present invention is directed to a reciprocating piston internal combustion engine that can utilize the charge stratification technique to achieve, among other things, a reduction in the proportion of pollutants in exhaust emissions through the controlled combustion in both its main or primary cylinders and its corresponding subsidiary cylinders of as homogeneous an air-fuel mixture as possible, of stoichiometric composition. Since the composition of the air-fuel mixture is essentially the same in both the primary and the subsidiary cylinders, a more complete combustion of the mixture can be attained. The speed and temperature of combustion must, however, be kept within required limits.

The inventive engine includes at least one primary cylinder and at least one primary piston, the piston being mounted for reciprocating movement in the cylinder. A cylinder head is mounted to overlie the primary cylinder and, with the primary cylinder and the face of the primary piston, defines a primary combustion chamber. At least one subsidiary cylinder is formed in the cylinder head and the subsidiary cylinder receives a subsidiary piston mounted for reciprocating movement in the cylinder. A subsidiary combustion chamber is defined within the subsidiary cylinder and the subsidiary combustion chamber communicates with the primary combustion chamber. The subsidiary piston moves upwardly in the subsidiary cylinder during upward movement of the primary piston in the primary cylinder and intermittently interrupts communication between the two combustion chambers. The subsidiary piston also compresses air-fuel mixture in the subsidiary combustion chamber to a higher pressure than air-fuel mixture is compressed in the primary combustion chamber by the primary piston.

In one embodiment of the invention, the subsidiary piston is rigidly coupled to the primary piston. As a result, compression in the subsidiary combustion chamber takes place in the same phase position as in the primary combustion chamber. In another embodiment, the primary piston is mounted on one end of a connecting rod and a bore is formed in the face of the primary piston. The subsidiary piston is articulated on the connecting rod and extends through the bore in the face of the primary piston. By appropriate construction of the connection between the subsidiary piston and the connecting rod, maximum pressure can be reached earlier in the subsidiary combustion chamber than in the primary combustion chamber.

In order to ensure communication between the two combustion chambers after ignition of the air-fuel mixture in the subsidiary combustion chamber, a recess may be formed in an axial surface of the subsidiary piston so as to cooperate with another recess formed in a surface that defines the subsidiary combustion chamber and that is separate from the subsidiary piston. The recesses align to afford communication between the two combustion chambers when the subsidiary piston is at about top dead center. A cylindrical sleeve may be rotatably mounted in the subsidiary cylinder so as to define in part the subsidiary combustion chamber. The recess formed in the combustion chamber surface is then formed in a wall of the sleeve and the timing of the communication between the primary and subsidiary combustion chambers is controllable by rotating the sleeve. One of the two recesses may also have a greater circumferential width than the other recess and also a guiding edge circumferentially oblique to the central longitudinal axis of the sleeve. The different recess widths and the oblique guiding edge assist in controlling the time of communication. The sleeve may be rotated in accordance with engine power output, engine speed or both engine power output and speed.

As can be seen from the above description, a combustible air-fuel mixture in a subsidiary combustion chamber of an engine according to the invention is compressed independently of the compression curve of an air-fuel mixture of similar proportions in a corresponding primary combustion chamber. The mixture in the subsidiary combustion chamber is also preferably compressed to higher pressures than the mixture in the primary combustion chamber. Consequently, conditions for ignition of the mixture are better realized and, if desired, earlier realized in the subsidiary chamber than in the primary chamber. After ignition of the air-fuel mixture in the subsidiary chamber, either by external ignition or, if the compression is sufficient, by self-ignition, the combustion is propagated into the primary combustion chamber by a flow of hot burning gases out of the subsidiary chamber. The operation of an internal combustion engine constructed according to the invention is especially effective because the air-fuel mixture introduced into the subsidiary combustion chamber or chambers is raised to an energy level such that ignition is certain even if some amount of exhaust gas is also mixed with the air-fuel mixture, in accordance with conventional methods, in order to diminish nitrogen oxide emissions, for example.

BRIEF DESCRIPTION OF THE DRAWINGS

For a better understanding of the invention, reference may be made to the following description of two exemplary embodiments, taken in conjunction with the figures of the accompanying drawings, in which.

DESCRIPTION OF EMBODIMENTS

Figure 1:
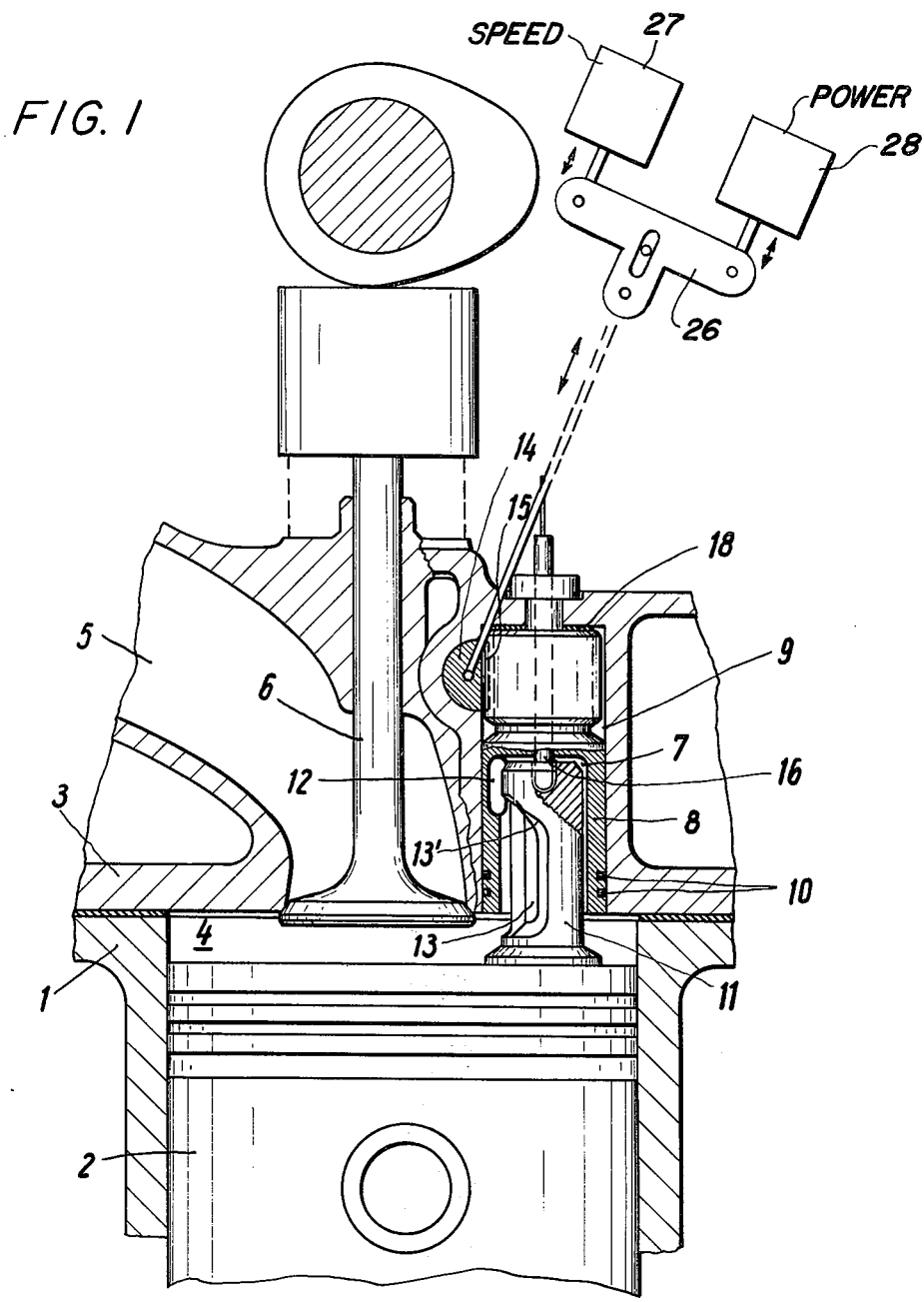
FIG. 1 is a partial sectional view of internal combustion engine according to the invention.

FIG. 1 of the drawings illustrates one cylinder 1 of a multi-cylinder internal combustion engine which receives a piston 2 for reciprocating movement in the cylinder. The cylinder 1 is covered by a cylinder head 3 and together the cylinder head, the cylinder and the face of the piston 2 define a combustion chamber 4 of variable volume. An inlet passage 5 conducts a combustible air-fuel mixture to the combustion chamber 4 and is closed by a conventional inlet valve 6. The inlet valve 6 is operated by a conventional camming mechanism, shown in part above the valve stem in FIG. 1. A similar outlet passage and outlet valve (not shown) permit exhaust gases to escape from the combustion chamber 4.

Immediately above the primary combustion chamber 4, a bore or cylinder 9 is formed in the cylinder head 3 so as to communicate at one end with the primary combustion chamber. A cylindrical sleeve 8, which is closed at one end, is rotatably mounted in the bore 9 and a pair of piston rings 10 seal off any space between the sleeve and the walls of the bore so that the space does not communicate with the primary combustion chamber 4. The sleeve 8 receives a subsidiary piston 11 and together the sleeve and the face of the piston define a subsidiary combustion chamber 7. The subsidiary piston 11 is rigidly attached to the face of the main piston 2 and has, on an outer surface, a longitudinally extending recess 13. The recess or slot 13 provides a continuous passage between the primary combustion chamber 4 and the subsidiary combustion chamber 7 by cooperating with a corresponding recess or slot 12 formed in the interior circumferential surface of the sleeve 8.

In operation of the engine shown in FIG. 1, a combustible air-fuel mixture is delivered through the inlet passage 5 to the primary combustion chamber 4, during a downward movement or intake stroke of the primary piston 2. Since the distance through which the primary piston 2 travels during one stroke is greater than the distance to which the subsidiary piston 11 can extend in the sleeve 8, the subsidiary piston 11 is fully clear of the sleeve at the end of the downward movement of the primary piston. Accordingly, the combustible air-fuel mixture can flow into the sleeve 8 and the subsidiary combustion chamber 7.

During the subsequent upward or compression stroke of the piston 2, which compresses the air-fuel mixture in the primary combustion chamber 4, the combustible mixture in the subsidiary combustion chamber 7 is similarly compressed by the subsidiary piston 11. The dimensions of the sleeve 8 and the subsidiary piston 11 are so chosen, however, that the compression attained in the subsidiary combustion chamber 7 reaches a higher final value than the compression in the primary combustion chamber 4. As the subsidiary piston 11 is thrust into the sleeve 8 during the compression stroke of the piston 2, communication between the subsidiary combustion chamber 7 and the primary combustion chamber 4 is interrupted. The subsidiary piston 11 moves upwardly through the sleeve 8 until the piston 11 reaches top dead center, at which point, the combustible mixture in the subsidiary combustion chamber 7 spontaneously ignites. At the same time, the recess 12 formed in the wall of the sleeve 8 and the corresponding recess 13 on the surface of the subsidiary piston 11 become partly overlapped so as to form a continuous passage from the subsidiary combustion chamber 7 to the primary combustion chamber 4. Thus, the burning gas produced on ignition of the mixture in the subsidiary combustion chamber 7 travels through the two recesses 12 and 13 into the primary combustion chamber 4 to ignite the primary mixture charge.

The rate at which combustion pressure in the primary combustion chamber 4 varies with respect to time (the time derivative time of the combustion pressure in the primary combustion chamber) can be controlled, to a large extent, by adjusting the size of the subsidiary combustion chamber 7 and the cross-sectional flow area of the passage defined by the two recesses 12 and 13. Control can also be effected by adjusting the timing of ignition in the subsidiary combustion chamber 7 and the timing of the opening of communication between the primary and subsidiary combustion chambers 4 and 7. In particular, the time at which the burning gas from the subsidiary combustion chamber 7 is introduced into the primary combustion chamber can be controlled by varying the time at which the recess 12 in the sleeve 8 and the recess 13 on the subsidiary piston 11 overlap each other. The timing can depend, for example, on the power output of the engine, engine speed or both power output and engine speed.

As shown in FIG. 1, the recess 13 in the subsidiary piston 11 has a greater circumferential width than the recess 12 in the sleeve 8. The recess 13 also has a guiding edge 13' that extends circumferentially of the subsidiary piston 11 and is oblique to the longitudinal axis or axis of travel of the subsidiary piston and similarly to the longitudinal axis of the sleeve 8. Accordingly, the timing of communication between the recess 12 and the recess 13 during the upstroke of the pistons 2 and 11 varies in accordance with the position of the lower end of the recess 12 relative to the oblique guiding edge 13' of the recess 13. The relative positions of the recesses 12 and 13 depend, in turn, upon the orientation of the rotatable sleeve 8 relative to the subsidiary piston 11.

In order to rotate the sleeve 8, gear teeth 15 are formed on an external circumferential surface of the sleeve and an axially movable rack 14 engages the teeth 15. The precise mechanism for axially moving the rack 14 depends upon the particular engine characteristic selected to control the rotation of the sleeve 8. For example, if the sleeve 8 is to be rotated as a function of the power output of the engine, a pneumatically operated vacuum controller can be utilized. The vacuum in the controller is modified as a function of the power output of the engine and acts on a piston that is, in turn, coupled to the rack 14 for axial movement thereof. For speed dependent rotational adjustment of the sleeve 8, on the other hand, a conventional centrifugal governor (flyball) may be used. When both the engine speed and the engine power output are to be used as controlling characteristics, the rack 14 may be articulated on a swingle-tree 26 connected at one end to a centrifugal governer 27 and at its other end to a vacuum controller 28. Control of the communication between the subsidiary combustion chamber 7 and the primary combustion chamber 4 should be monitored so that a desired smooth engine run with pressure increases at not too fast a rate are achieved. Upon increasing speed of the engine, the communication will tend to be opened earlier, while on increasing power output of the engine, the communication may be opened later.

In every case, the air-fuel mixture in the subsidiary combustion chamber 7 must be ignited and flashed before the communication between the subsidiary chamber and the primary combustion chamber 4 is opened. As noted above, ignition in the subsidiary combustion chamber 7 may be achieved by sufficiently high compression. Alternatively, an auxiliary electrically heatable glow plug 16 may extend into the subsidiary combustion chamber 7 or a sparkplug, for example, may be mounted in the subsidiary combustion chamber to ignite the mixture charge in the subsidiary chamber.

In order to obtain orderly combustion in the primary combustion chamber 4 without excessive peak combustion temperature or consequent high nitrogen oxide production, a suitable motion, such as a rotation, of the combustible mixture charge is preferably set up in the primary combustion chamber. Burning gas energes from the subsidiary combustion chamber 7 into the primary combustion chamber 4 in the direction of the motion. The production of nitrogen oxides can also be lowered by controlled addition of exhaust gas and/or some inert gas distributed as uniformly and homogenously as possible throughout the charge in both the primary combustion chamber 4 and the subsidiary chamber 7.

Figure 2:
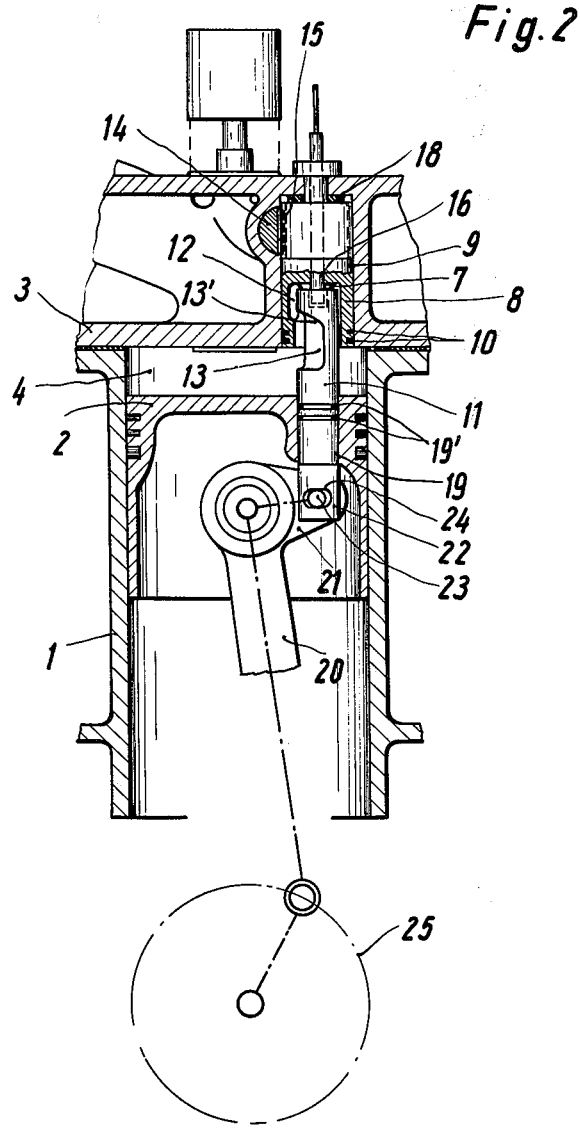
FIG. 2 is a partial sectional view of a second embodiment of a reciprocating piston internal combustion engine according to the invention.

In the embodiment of the invention illustrated in FIG. 2, a phase shift is permitted in the compression curves of the two combustion chambers 4 and 7. The subsidiary piston 11 passes through a bore 19 formed in the face of the primary piston 2. The space between the wall of bore 19 and the surface of the subsidiary piston 11 is sealed by sealing rings 19' mounted in the external surface of the subsidiary piston. At its lower end 22, the subsidiary piston 11 is articulated on a laterally extending lug 21 of the connecting rod 20 that mounts the primary piston 2 on the engine crank shaft (not shown). The connection between the subsidiary piston 11 and the lug 21 is provided by a pin 23 that passes through the hole 24 in the lower end 22 of the piston 11. The hole 24 is laterally extended to permit some relative lateral movement between the lug 21 and the subsidiary piston 11. Due to the lateral offset between the point at which the subsidiary piston 11 is articulated on the connecting rod lug 21 and the point at which the primary piston 2 is mounted on the connecting rod 20, the relative positions of the two points longitudinally of the primary cylinder 1 vary as the primary piston 2 reciprocates in the primary cylinder. Consequently, the motions of the two pistons 2 and 11 and the resulting compression pressure curves in the two combustion chambers 4 and 7 are out of phase relative to each other. Upon counterclockwise rotation of the crankshaft (the crank circle being indicated by the dot-dash line 25 in FIG. 2), for example, maximum compression is reached in the subsidiary combustion chamber 7 before maximum compression is reached in the primary combustion chamber 4. As a result, more latitude is obtained for controlling the time at which burning air-fuel mixture from the subsidiary combustion chamber 7 is transmitted to the primary combustion chamber 4.

In the embodiments of both FIGS. 1 and 2, the rotatable sleeve 8 is sealed against the wall of the bore 9 in cylinder head 3 by piston rings 10. In order to provide an axial breathing motion of the rings 10 and thereby obtain the necessary self-cleaning of the mounting grooves for the rings 10, a flat spring 18 is placed between the closed upper end of the sleeve 8 and the adjacent surface of the cylinder head 3. The spring 18 permits a small axial movement of the sleeve 8 and, at the same time, absorbs some of the force applied by peak combustion pressures in the subsidiary combustion chamber 7.

In each of the embodiments of the invention described above, a relatively small volume of combustible air-fuel mixture in a subsidiary combustion chamber is compressed essentially independently of compression in the corresponding primary combustion chamber and ignition is achieved in the subsidiary combustion chamber before ignition in the primary combustion chamber to produce a two-stage combustion process, as in conventional stratified charge engines. The desired low threshold for dependable ignition of the combustible mixture in the subsidiary combustion chamber is not achieved, however, by using a nonhomogeneous or "fat" mixture in the subsidiary chamber, as in conventional stratified charge engines. Rather, a homogenous mixture may be introduced into both the primary and the subsidiary combustion chambers, possibly diluted with inert gases or exhaust gas, and the charge in the subsidiary chamber is compressed to a higher, or even a supracritical, energy level by a divided compression process. The independent compression of the combustible mixture in the subsidiary combustion chamber, especially if the mixture is also mixed with exhaust gas and/or inert gases to lower the combustion temperatures, results in a substantial improvement in ignition behavior of the mixture owing to the additional increment of mechanical energy provided to the subsidiary combustion chamber. The additional energy initially affects only the mixture in the subsidiary combustion chamber, but when the burning gases flow into the primary combustion chamber, after ignition of the mixture in the subsidiary combustion chamber, the mixture in the primary chamber is dependably ignited.

It will be understood that the embodiments described above are merely exemplary and that persons skilled in the art may make many variations and modifications without departing from the spirit and scope of the invention. All such modifications and variations are intended to be within the scope of the invention as defined in the appended claims.

I claim:

1. A reciprocating piston internal combustion engine comprising:
   a. at least one primary cylinder;
   b. at least one primary piston, the primary piston being mounted for reciprocating movement in the primary cylinder;
   c. a cylinder head mounted to overlie the primary cylinder and with the primary cylinder and a face of the primary piston defining a primary combustion chamber;
   d. at least one subsidiary cylinder formed in the cylinder head; and
   e. at least one subsidiary piston, the subsidiary piston being mounted for reciprocating movement in the subsidiary cylinder,
   a subsidiary combustion chamber being defined within the subsidiary cylinder and communicating with the primary combustion chamber, the subsidiary piston being mounted to move upwardly in the subsidiary cylinder during upward movement of the primary piston in the primary cylinder and having means for interrupting, at least intermittently, the communication between the primary and subsidiary combustion chambers, the subsidiary piston being dimensioned to compress an air-fuel mixture in the subsidiary combustion chamber to a higher pressure than the air-fuel mixture compressed in the primary combustion chamber by the primary piston,
   f. wherein a first recess is formed in an axial surface of said subsidiary piston that cooperates with a second recess formed in a rotatable cylindrical sleeve surface that defines said subsidiary combustion chamber and is separate from the subsidiary piston to provide communication between the primary and secondary combustion chambers when the subsidiary piston is at about top dead center.

2. A reciprocating piston internal combustion engine according to claim 1, wherein the subsidiary piston is rigidly coupled to the primary piston.

3. A reciprocating piston internal combustion engine according to claim 1, further comprising at least one connecting rod for a piston, the primary piston being mounted at one end of the connecting rod, and wherein the face of the primary piston has a bore formed therein, the subsidiary piston being articulated on the connecting rod and extending through the bore in the primary piston face.

4. A reciprocating piston internal combustion engine according to claim 1, further comprising a cylindrical sleeve that is rotatably mounted in the subsidiary cylinder and that defines at least in part the subsidiary combustion chamber, the second recess being formed in a wall of the sleeve and the timing of the communication between the primary and subsidiary combustion chambers being controllable by rotating the sleeve.

5. A reciprocating piston combustion engine according to claim 4, wherein one of the first and second recesses has a greater circumferential width than the other of the recesses and has a guiding edge circumferentially oblique to the central longitudinal axis of the sleeve.

6. A reciprocating piston internal combustion engine according to claim 4, wherein the sleeve is rotated in accordance with engine power output.

7. A reciprocating piston internal combustion engine according to claim 4, wherein the sleeve is rotated in accordance with engine speed.

8. A reciprocating piston internal combustion engine according to claim 4, wherein the sleeve is rotated in accordance with engine power output and engine speed.

9. A reciprocating piston internal combustion engine according to claim 4, further comprising a spring biasing the sleeve axially away from a surface of the cylinder head.

* * * * *